United States Patent
Zhang et al.

(12) 
(10) Patent No.: US 10,212,019 B1
(45) Date of Patent: Feb. 19, 2019

(54) SUB-CARRIER ADAPTATION IN MULTI-CARRIER COMMUNICATION SYSTEMS

(71) Applicant: Marvell International Ltd., Hamilton (BM)

(72) Inventors: Hongyuan Zhang, Fremont, CA (US); Hui-Ling Lou, Sunnyvale, CA (US); Songping Wu, Cupertino, CA (US)

(73) Assignee: Marvell International Ltd., Hamilton (BM)

(*) Notice: Subject to any disclaimer, the term of this patent is extended or adjusted under 35 U.S.C. 154(b) by 0 days.

(21) Appl. No.: 16/113,972

(22) Filed: Aug. 27, 2018

Related U.S. Application Data

(63) Continuation of application No. 15/451,177, filed on Mar. 6, 2017, now Pat. No. 10,063,402, which is a continuation of application No. 12/552,966, filed on Sep. 2, 2009, now Pat. No. 9,590,832.

(60) Provisional application No. 61/099,350, filed on Sep. 23, 2008.

(51) Int. Cl.
| | |
|---|---|
| *H04L 5/12* | (2006.01) |
| *H04L 23/02* | (2006.01) |
| *H04L 27/34* | (2006.01) |
| *H04L 5/00* | (2006.01) |
| *H04L 25/02* | (2006.01) |
| *H04L 27/26* | (2006.01) |

(52) U.S. Cl.
CPC .............. *H04L 27/34* (2013.01); *H04L 5/006* (2013.01); *H04L 5/0046* (2013.01); *H04L 25/0204* (2013.01); *H04L 25/0262* (2013.01); *H04L 27/2647* (2013.01); *H04L 5/0007* (2013.01); *H04L 27/2657* (2013.01)

(58) Field of Classification Search
CPC .............. H04L 27/2647; H04L 5/0007; H04L 27/2657; H04L 27/2662; H04L 5/0048
USPC ......................................... 375/261
See application file for complete search history.

(56) References Cited

U.S. PATENT DOCUMENTS

| | | | |
|---|---|---|---|
| 10,063,402 B1 | 8/2018 | Zhang et al. | |
| 2006/0256761 A1* | 11/2006 | Meylan ................. | H04B 7/0417 370/338 |
| 2007/0047665 A1* | 3/2007 | Friend ..................... | H04L 27/02 375/260 |
| 2007/0211667 A1* | 9/2007 | Agrawal ................. | H04L 5/023 370/335 |
| 2009/0016463 A1* | 1/2009 | Roh ...................... | H04B 7/0417 375/295 |

* cited by examiner

*Primary Examiner* — Tanmay Shah

(57) ABSTRACT

A communication device determines an estimate of a communication channel, and determines, based on the estimate of the communication channel, a plurality of pairs of modulation schemes and encoding schemes to be used for a packet, including: i) determining, for a first set of adjacent orthogonal frequency division multiplexing (OFDM) subcarriers, a first pair of a modulation scheme and an encoding scheme; and ii) determining, for a second set of adjacent OFDM subcarriers, a second pair of a modulation scheme and an encoding scheme, the second pair being different than the first pair. The communication device generates the packet for transmission, wherein i) all data modulated on the first set of adjacent OFDM subcarriers is modulated and encoded using the first pair, and ii) all data modulated on the second set of adjacent OFDM subcarriers is modulated and encoded using the second pair.

15 Claims, 4 Drawing Sheets

SUB-CARRIER ADAPTATION IN MULTI-CARRIER COMMUNICATION SYSTEMS

CROSS REFERENCE TO RELATED APPLICATION

This application is a continuation of U.S. patent application Ser. No. 15/451,177, now U.S. Pat. No. 10,063,402, entitled "Sub-Carrier Adaptation in Multi-Carrier Communication Systems," filed on Mar. 6, 2017, which is a continuation of U.S. patent application Ser. No. 12/552,966, entitled "Sub-Carrier Adaptation in Multi-Carrier Communication Systems," filed on Sep. 2, 2009, which claims the benefit of U.S. Provisional Patent Application No. 61/099,350, entitled "Frequency Domain Link Adaptation in OFDM Systems," filed on Sep. 23, 2008. All of the applications referenced above are incorporated herein by reference in their entireties.

FIELD OF TECHNOLOGY

The present disclosure relates generally to multi-carrier communication systems and, more particularly, to sub-carrier adaptation in multi-carrier communication systems.

BACKGROUND

An ever-increasing number of relatively inexpensive, low power wireless data communication services, networks and devices have been made available over the past number of years, promising near wire speed transmission and reliability. Various wireless technology is described in detail in the 802 IEEE Standards, including for example, the IEEE Standard 802.11a (1999) and its updates and amendments, the IEEE Standard 802.11g (2003), and the IEEE Standard 802.11n now in the process of being adopted, all of which are collectively incorporated herein fully by reference. These standards have been or are in the process of being commercialized with the promise of 54 Mbps or higher data rate, making them a strong competitor to traditional wired Ethernet and the more common "802.11b" or "WiFi" 11 Mbps mobile wireless transmission standard.

Generally speaking, transmission systems compliant with the IEEE 802.11a and 802.11g or "802.11a/g" standards as well as the IEEE 802.11n standard achieve their high data transmission rates using multi-carrier schemes such as Orthogonal Frequency Division Multiplexing (OFDM). Generally speaking, the use of OFDM divides the overall system bandwidth into a number of frequency sub-bands or channels, with each frequency sub-band being associated with a respective carrier, or sub-carrier. Data upon each sub-carrier may be modulated with a modulation scheme such as quadrature amplitude modulation (QAM), phase shift keying, etc. Thus, each frequency sub-band of the OFDM system may be viewed as an independent transmission channel within which to send data, thereby increasing the overall throughput or transmission rate of the communication system.

Generally, transmitters used in the wireless communication systems that are compliant with the aforementioned 802.11a/802.11g/802.11n standards as well as other standards such as the 802.16 IEEE Standard, perform multi-carrier OFDM symbol encoding (which may include error correction encoding and interleaving), convert the encoded symbols into the time domain using Inverse Fast Fourier Transform (IFFT) techniques, and perform digital to analog conversion and conventional radio frequency (RF) upconversion on the signals. These transmitters then transmit the modulated and upconverted signals after appropriate power amplification to one or more receivers, resulting in a relatively high-speed time domain signal with a large peak-to-average ratio (PAR).

Likewise, the receivers used in the wireless communication systems that are compliant with the aforementioned 802.11a/802.11g/802.11n and 802.16 IEEE standards generally include an RF receiving unit that performs RF down-conversion and filtering of the received signals (which may be performed in one or more stages), and a baseband processor unit that processes the OFDM encoded symbols bearing the data of interest. Generally, the digital form of each OFDM symbol presented in the frequency domain is recovered after baseband downconversion, conventional analog to digital conversion and Fast Fourier Transformation of the received time domain analog signal. Thereafter, the baseband processor performs frequency domain equalization (FEQ) and demodulation to recover the transmitted symbols. The recovered and recognized stream of symbols is then decoded, which may include deinterleaving and error correction using any of a number of known error correction techniques, to produce a set of recovered signals corresponding to the original signals transmitted by the transmitter.

The transmitters and receivers in the wireless communication system may each be capable of using a variety of modulation and/or coding schemes. Different modulation and/or coding schemes may provide different bit rates and/or different error rates. For example, in the QAM scheme, moving to a higher order constellation (e.g., from 16-QAM to 64-QAM) may make it possible to transmit more bits per symbol and thus increase the bit rate. At the same time a signal modulated with a higher order constellation may be more susceptible to noise. Generally speaking, therefore, modulation schemes that provide a higher bit rate may be more sensitive to channel impairments as compared to modulation schemes with a lower bit rates.

In wireless communication systems, signals generated by the transmitter may reach a particular receiver via a number of different propagation paths, the characteristics of which typically change over time due to the phenomena of multi-path and fading. Moreover, the characteristics of a propagation channel differ or vary based on the frequency of propagation. As a result, different frequency channels, such as the channels associated with each of the OFDM sub-bands discussed above, may have different characteristics (e.g., different gains, signal-to-noise ratios, and so on). Consequently, different frequency channels may support different bit rates and, hence, different modulation and/or coding schemes.

SUMMARY

In an embodiment, a method includes: determining, at a communication device, an estimate of a communication channel; and determining, at the communication device and using the estimate of the communication channel, a plurality of pairs of i) modulation schemes and ii) encoding schemes to be used with respective sets of adjacent orthogonal frequency division multiplexing (OFDM) subcarriers, including: determining, for data to be transmitted via a first set of adjacent OFDM, subcarriers, a first pair of a) a modulation scheme and b) an encoding scheme, and determining, for data to be transmitted via a second set of adjacent OFDM subcarriers, a second pair of a) a modulation scheme and b) an encoding scheme, wherein the second pair is different than the first pair. The method also include: generating, at the communication device, a packet for transmission via the communication channel, wherein i) all data modulated on the first set of adjacent OFDM subcarriers is modulated and encoded using the first pair of a) the modulation scheme and b) the encoding scheme, and ii) all data modulated on the second set of adjacent OFDM subcarriers is modulated and encoded using the second pair of a) the modulation scheme and b) the encoding scheme; and transmitting, by the communication device, the packet.

In another embodiment, an apparatus comprises: a communication device implemented on one or more integrated circuits (ICs). The communication device includes: a channel estimator implemented on the one or more ICs, wherein the channel estimator configured to determine an estimate of a communication channel. The communication device also includes: a channel adaptation unit implemented on the one or more ICs. The channel adaptation unit is configured to determine, using the estimate of the communication channel, a plurality of pairs of i) modulation schemes and ii) encoding schemes to be used with respective sets of adjacent orthogonal frequency division multiplexing (OFDM) subcarriers, including: determining, for data to be transmitted via a first set of adjacent OFDM, subcarriers, a first pair of a) a modulation scheme and b) an encoding scheme, and determining, for data to be transmitted via a second set of adjacent OFDM subcarriers, a second pair of a) a modulation scheme and b) an encoding scheme, wherein the second pair is different than the first pair. The communication device further includes a transmitter unit implemented on the one or more ICs. The transmitter unit configured to generate the packet for transmission, wherein: i) all data modulated on the first set of adjacent OFDM subcarriers is modulated and encoded using the first pair of a) the modulation scheme and b) the encoding scheme, and ii) all data modulated on the second set of adjacent OFDM subcarriers is modulated and encoded using the second pair of a) the modulation scheme and b) the encoding scheme. The transmitter unit is further configured to transmit the packet.

When individual elements are designated by references numbers in the form Nn, these elements may be collectively referred by N.

DETAILED DESCRIPTION

Figure 1:
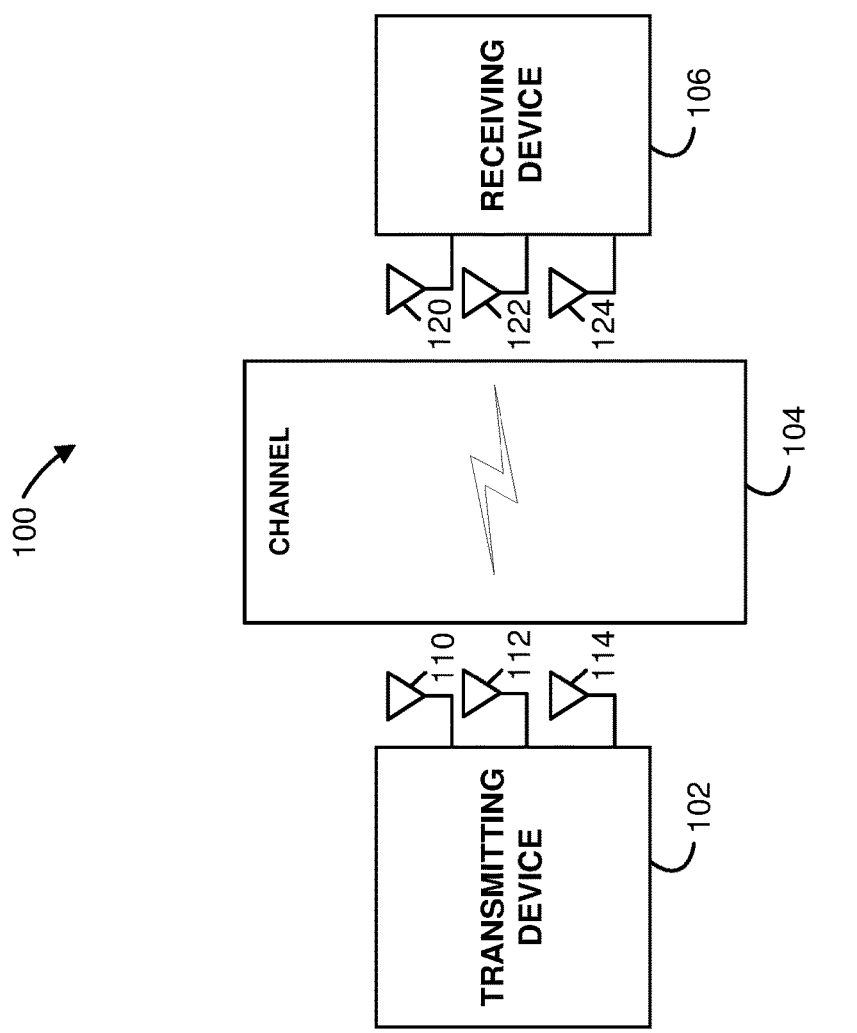
FIG. 1 is a block diagram of an example wireless communication system that may utilize sub-carrier adaptation techniques described herein.

FIG. 1 is a block diagram of an example wireless communication system 100 in which multiple communication devices, e.g., a transmitting device 102 and a receiving device 104 may communicate with each other via a wireless communication channel 104. Each of the communication devices 102 and 106 may be, for example, a stationary device, such as a base station, or a mobile station equipped with a set of antennas 110-114 and 120-124, respectively. Although the wireless communication system 100 illustrated in FIG. 1 includes two devices, the wireless communication system 100 may, of course, include any number of devices, each equipped with the same or a different number of antennas (e.g., 1, 2, 3, 4 antennas and so on).

Furthermore, although the wireless communication system 100 illustrated in FIG. 1 includes a transmitting device 102 and a receiving device 106, devices in the wireless communication system 100 may generally operate in multiple modes (e.g., a transmit mode and a receive mode). For example, if a given device is a mobile station in a WiMAX communication network or a lap top computer having an IEEE Standard 802.11n compliant wireless transceiver, the device may operate in both a transmit mode and a receive mode. Accordingly, in some embodiments, antennas 110-114 and 120-124 may support both transmission and reception. Alternatively, or additionally, a given device may include separate transmit antennas and separate receive antennas.

The transmitting device 102 and the receiving device 106 can communicate using a single frequency or multiple frequencies. When the transmitting device 102 and the receiving device 106 communicate using multiple frequencies, the communication channel 104 can include multiple carriers or subcarriers, each associated with a particular frequency at which the devices 102 and 106 may communicate. In some embodiments, the wireless communication system 100 uses an OFDM technique, and the subcarriers are selected to be mutually orthogonal (i.e., to minimize cross-talk between each pair of subcarriers). However, the wireless communication system 100 could also use any other frequency division multiplexing technique.

The wireless communication channel 104 via which the transmitting device 102 and the receiving device 106 communicate may be a frequency-selective channel that may experience frequency-selective fading. That is, different frequency components or frequency sub-channels of the channel 104 may experience different magnitudes of fading. As a result, different frequency sub-channels of the channel 104 may support different bit rates and, hence, different modulation and/or coding schemes. Communication devices communicating via the wireless communication channel 104 may therefore need to adjust their modulation and/or coding schemes to compensate for the different magnitudes of fading on the different frequency sub-channels of the wireless communication channel 104.

One or both of the devices 102, 106 are capable of sub-carrier adaptation. For example, the device 102 can determine different modulation/coding schemes for use on different subcarriers. The different modulation/coding schemes for use on different subcarriers can be determined based on an estimate of the channel 104. Example sub-carrier adaptation schemes that may be utilized by the device 102 and/or the device 106 are described below.

Figure 2:
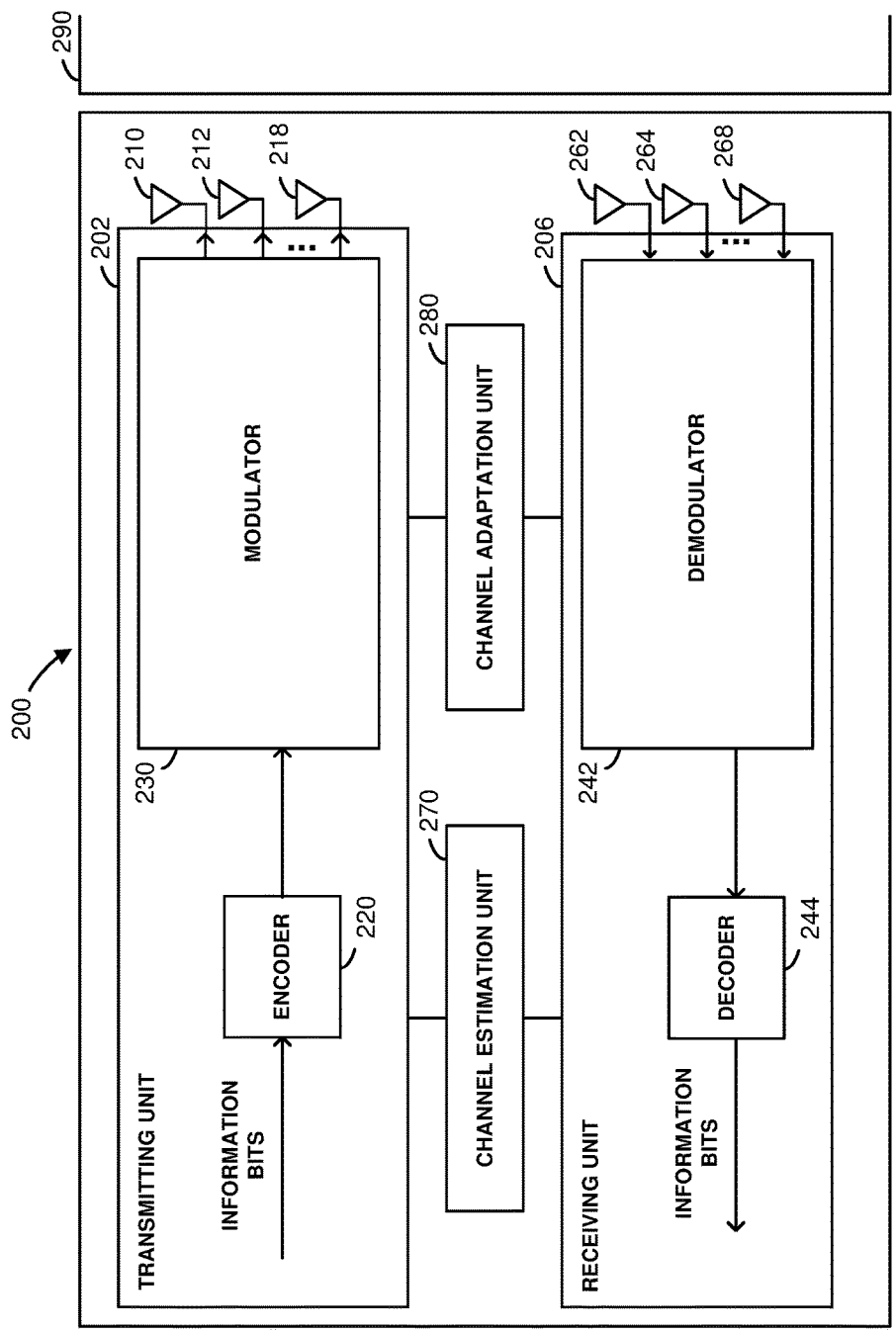
FIG. 2 is a block diagram of an communication device that may utilize sub-carrier adaptation techniques described herein.

FIG. 2 is a block diagram of an example communication device 200. The communication device 200 may be utilized in the wireless communication system 100 as the transmitting device 102, or the receiving device 106, for example. It will be understood, however, that the wireless communication system 100 may alternatively use other transmitting devices 102 and/or other receiving devices 106.

Referring to FIG. 2, the communication device 200 includes a transmitting unit 202 for converting a sequence of information bits into signals appropriate for transmission via a wireless channel 290 and a receiving unit 206 for receiving signals via the wireless channel 290 and converting the received signals into information bits. The communication device 200 further includes a channel estimation unit 270 for estimating the characteristics of each of the frequency sub-channels of the wireless channel 290 and a channel adaptation unit 280 for adjusting the transmission bit rate (e.g., by adjusting the modulation and/or coding schemes) of the communication device 200 for the different sub-channels.

Generally speaking, the channel estimation unit 270 determines an estimate of the forward communication channel based on received data units. These data units may be responses to, or acknowledgements (ACKs) of the data units transmitted by the communication device 200. Alternatively, or additionally, these data units may be communications initiated by other communication devices.

Based on the estimate of the forward communication channel provided by the channel estimation unit 270, the channel adaptation unit 280 generally configures the bit rate for the different frequency sub-channels via which the communication device 200 is communicating. More specifically, the adaptation unit 280 uses the channel estimate to determine the bit allocation across the different sub-channels. That is, the adaptation unit 280 can configure the communication device 200 to transmit a different number of bits via different sub-channels. The adaptation unit 280 may further cause an indication of the bit allocation to be included in the header (e.g., PHY header) or in MAC frame body of the transmitted data units.

The transmitting unit 202 of the communication device 200 includes an encoder 220 (e.g., a convolution encoder) that encodes information bits, and a modulator 230 that modulates the encoded bits into symbols, which symbols are mapped to subcarriers and converted to signals appropriate for transmission, e.g., via transmit antennas 210-218. Similarly, the receiving unit 206 includes a demodulator 242 and a decoder 244 for decoding and demodulating received signals.

The communication device 200, in some embodiments, or in some modes of operation, may not include one or more of the components and/or modules shown in FIG. 2 or, alternatively, may not use each of these components and/or modules. Further, it will be appreciated that some of the components and/or modules shown in FIG. 2 may be combined. Still further, the communication device 200 may include additional components and/or modules that, for ease of explanation, are not shown in FIG. 2. For example, the transmitting unit 202 can include an interleaver that interleaves the encoded bits to mitigate burst errors and the receiving unit 206 can include a deinterleaver. The transmitting unit 202 and the receiving unit 206 may further include analog radio frequency (RF) front ends for performing frequency upconversion and/or downconversion, various filters, power amplifiers, and so on. The receiving unit 206 may additionally include, for example, a linear equalizer, e.g., a zero-forcing equalizer.

Different components and/or modules of the communication device 200 may be implemented as hardware, a processor executing software instructions, a processor implementing firmware instructions, or some combination thereof. For example, some or all of the components may be custom integrated circuits, application-specific integration circuits (ASICs), etc., communicatively coupled by electrical busses. In this case, the communication device 200 optionally may include bypass busses (not shown) to bypass some of the components if the currently active mode does not require certain operations.

Figures 3A, 3B:
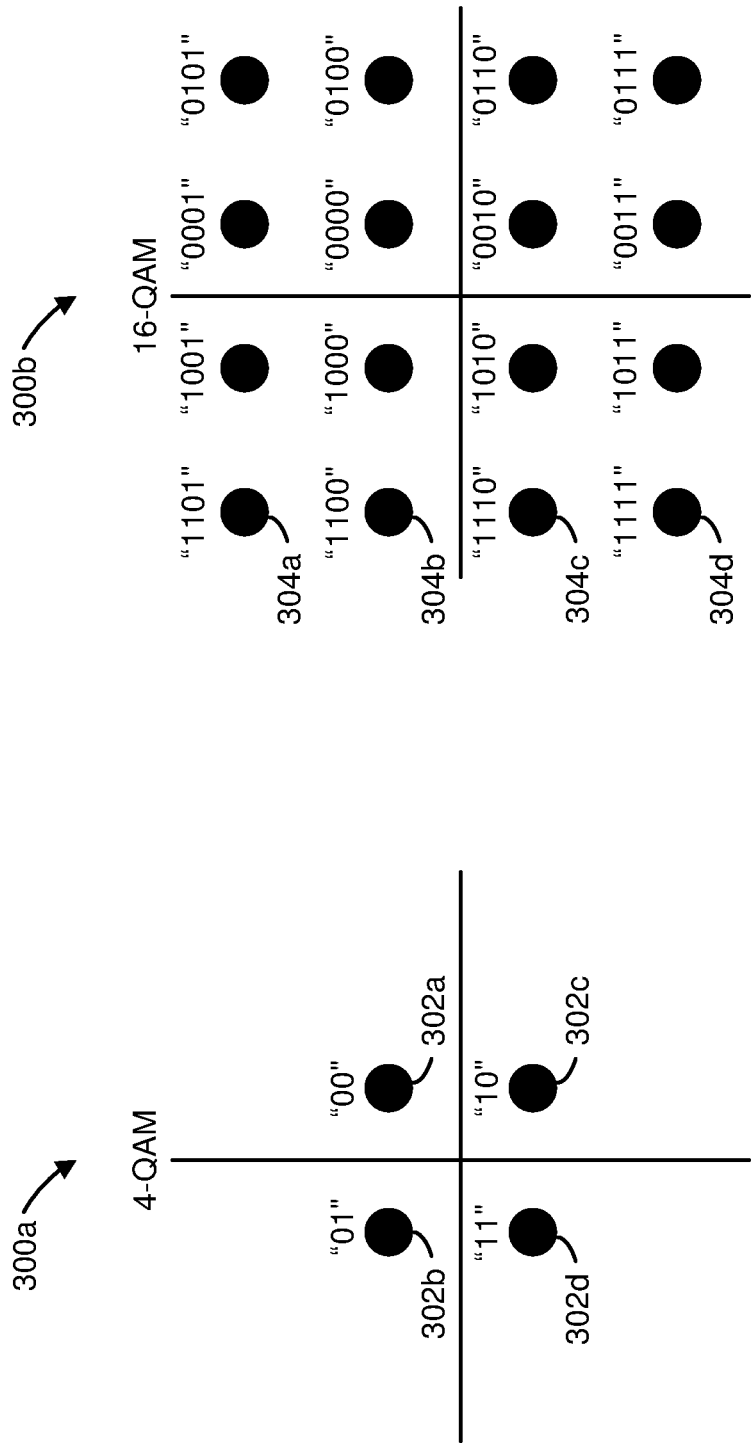
FIG. 3A is an example constellation set for a 4-QAM scheme.
FIG. 3B is an example constellation set for a 16-QAM scheme.

The communication device 200 may be capable of using a variety of modulation and/or coding schemes for transmitting information. For example, in some embodiments, the modulator 230 may use QAM to map bits to symbols in various types of QAM signal constellation sets, where the symbols are differentiated from one another by phase and/or magnitude. For example, FIG. 3A illustrates a 4-QAM constellation set 300*a* in an in phase (I) and quadrature phase (Q) plane. In this case, constellation points 302*a*-302*d* are distinguishable only by phase. Each constellation point 302 represents a different two-bit symbol: 302*a* may represent "00," 302*b* may represent "01," 302*c* may represent "10," and 302*d* may represent "11." However, other bit to symbol mappings may be utilized.

Similarly, FIG. 3B illustrates a 16-QAM constellation set 300*b*, where four-bit sequences correspond to symbols. Here, both the amplitude and the phase of constellation points 304 may vary. FIG. 3B illustrates a mapping, where each constellation point 304 represents a different four-bit symbol: 304*a* may represent "1101," 304*b* may represent "1100," 304*c* may represent "1110," 304*d* may represent "1111," and so on. However, as discussed in reference to FIG. 3A, other mappings may be utilized.

In general, a W-bit symbol may be mapped according to an M-QAM signal set, where $M=2^W$. Thus, as illustrated in FIG. 3A, if the modulator 230 uses the 4-QAM modulation scheme, the modulator 230 will have a signal alphabet size of $M=2^2=4$ (i.e., 4 constellation points), and will map 2-bit pairs into the 4 constellation points. If the modulator 230 uses a 64-QAM scheme, the modulator 230*a* will have an alphabet size of $M=2^6=64$ (i.e., 64 constellation points) and will map 6-bit segments into the 64 constellation points.

Although QAM modulation has been discussed, it will be understood that many other types of modulation may also be utilized.

As the order M of the constellation set increases, the more bits can be transmitted in a given symbol. At the same time, as the spacing between the constellation points decreases, the likelihood of error increases. As a result, a higher-order modulation scheme may require that a wireless communication channel (e.g., channel 104) support higher bit rates, whereas a lower a lower-order modulation scheme may be implemented with lower bit rates. Accordingly, generally speaking, frequency sub-channels (e.g., OFDM sub-channels) that support higher bit rates may support higher-order modulation schemes.

Because different frequency sub-channels of a frequency-selective communication channel may support different bit rates, a communication device (e.g., communication device 200) communicating via a frequency-selective communication channel may use different modulation schemes on different sub-channels in order to optimize the use of the wireless frequency-selective communication channel. Likewise, the communication device may use different encoding schemes on different sub-channels. For example, a better quality sub-channel may need less encoding. Thus, more information bits can be sent through such a sub-channel because, for instance, fewer parity bits need to be sent. In general, the communication device can adapt to the different conditions of the various sub-channels by adjusting the bit rates of the data sent on the respective sub-carrier frequencies (e.g., by adjusting modulation schemes, encoding schemes, error-correction schemes, and so on).

As described above, in some embodiments, a communication device operating in a multi-carrier communication system can be configured to have different bit rates associated with different subcarriers (e.g., by using different modulation schemes, encoding schemes, etc., on the different subcarriers). Alternatively, or additionally, in some embodiments, a communication device operating in a multi-carrier communication system can be configured to have different bit rates associated with different groups of subcarriers. For example, a particular modulation-encoding combination scheme can be used with one group of subcarriers, and another modulation-encoding combination scheme can be used with another group of subcarriers.

Figure 4:
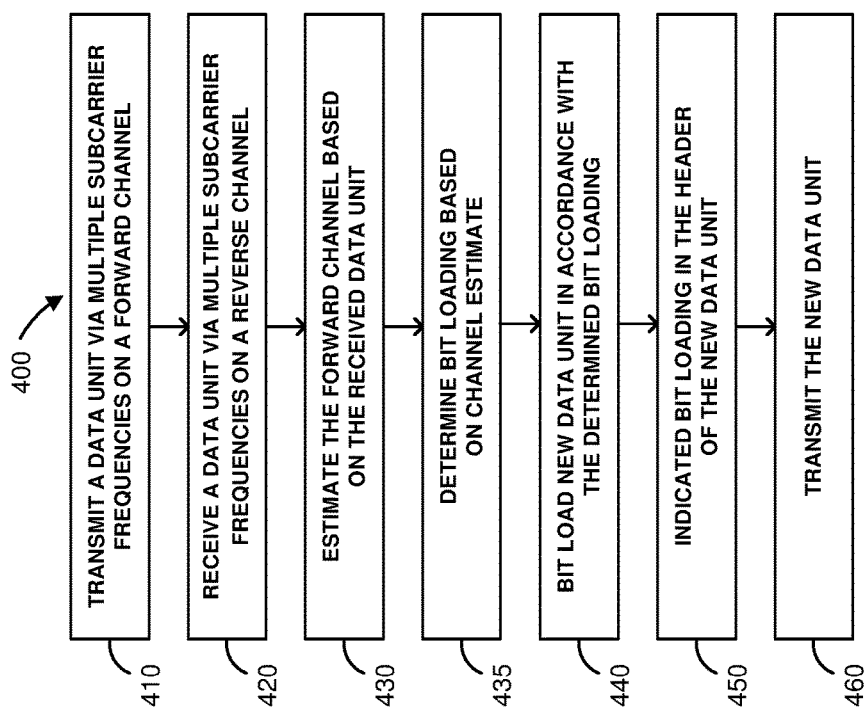
FIG. 4 is a flow diagram of an example sub-carrier adaptation method.

FIG. 4 is a flow diagram of an example sub-carrier adaptation method 400 that can be used by a communication device (e.g., the communication device 200 illustrated in FIG. 4) to adapt to the different conditions of the various sub-channels of the communication channel. For ease of explanation, FIG. 4 will be described with reference to FIGS. 1-3B. It will be understood, however, that the sub-carrier adaptation method 400 may be utilized with systems, devices and modulation schemes other than those illustrated in FIGS. 1-3B. One or more blocks within the method 400 may be performed in a different order (or concurrently) and still achieve desirable results.

Referring to FIG. 4, a communication device generally transmits data units (e.g., packets, frames, and so on) via multiple subcarrier frequencies via a forward communication channel (block 410). The communication device can also receive data units via multiple subcarrier frequencies via a reverse communication channel (block 420). For example, the received data units may be acknowledgements (ACKs) of the transmitted data units. However, in some embodiments, the received data units may be other types of data units that are, for example, related to communications initiated by other communication devices (e.g., and not related to any transmitted data units).

Generally speaking, the data units received on the reverse communication channel are used to estimate the forward communication channel (block 430). For example, an ACK for a given transmitted data unit may arrive via the reverse communication channel, and the communication device may use the received ACK to estimate the forward communication channel via which the communication device transmitted the data unit that is being acknowledged. Using data units received on the reverse communication channel to estimate the forward communication channel may be particularly suitable in single spatial stream systems (e.g., 60 GHz systems), where impairments of the over-the-air channel may be similar on the forward communication channel and the reverse communication channel.

The communication device may use the received data unit to estimate the forward channel in a variety of ways, including using channel estimation techniques known in the art, such as least squares channel estimation, iterative channel estimation, direct per-subcarrier channel estimations, and so on.

Based on the channel estimate, the communication device determines a suitable bit loading (block 435). For example, based on the channel estimate, the communication device may determine suitable bit rates that the different frequency components, or sub-channels, of the communication channel are capable of supporting. For instance, the communication device may determine that some of the frequency sub-channels are not adequate to support any acceptable bit rates and, hence decide not to transmit data on those frequency sub-channels (until, for example, the communication device determines in the future that these sub-channels are capable of supporting acceptable bit rates). The determined bit rates may be collectively referred to as a determined bit loading.

After determining the bit loading (block 435), if the communication device transmits new data units (block 460), the communication device "bit loads" the new data units in accordance with the determined bit loading (block 440). That is, the communication device may assign, or allocate bits of data units across the different frequency subcarriers corresponding to the frequency sub-channels of the communication channel based on the determined bit rates associated with these frequency sub-channels. For example, if some of the frequency sub-channels were determined not capable of adequately supporting any acceptable bit rates, the communication device may send no bits via these subcarriers. If some of the frequency sub-channels are determined to be capable of supporting relatively low bit rates, the communication device may allocate relatively few bits to these subcarriers and utilize a relatively low-order modulation/coding scheme. On the other hand, if some of the frequency sub-channels were determined to be capable of supporting relatively high bit rates, the communication device may allocate relatively many bits to these subcarriers and utilize a relatively high-order modulation/coding scheme.

Once the communication device transmits a new data unit and another communication device receives that data unit, the other device may need to determine the allocation of bits across the different subcarriers. In order to enable other communication devices to do so, the communication device that transmits the new data unit may include data in that new data units that indicates the allocation of bits across the subcarriers. For example, new data unit may include that data in its header, e.g., physical layer (PHY) header, or media access control (MAC) layer frame body of a preceding frame (block 460). However, data indicating the allocation of bits across the subcarriers may be included in other portions of the new data unit, or in other frames.

The example sub-carrier adaptation method 400 may realize zero, one, or more of the following advantages depending on the particular implementation. For example, a communication device that uses the sub-carrier adaptation method 400, or a similar method, may utilize the communication channel more efficiently by minimizing retransmissions over inefficient sub-channels and maximizing the use of relatively efficient ones. As another example, because the sub-carrier adaptation method 400 is adaptive, communication devices using this or similar methods may adapt to the changing conditions of the communication channel over time. This may generally lead to zero, one, or more of higher throughput, lower delay, fewer instances of data loss, and, more generally, improved efficiency, depending on the particular implementation.

At least some of the various blocks, operations, and techniques described above may be implemented using hardware, a processor executing firmware instructions, a processor executing software instructions, or any combination thereof. When implemented using a processor executing firmware or software instructions, the software or firmware may be stored in any computer readable memory such as on a magnetic disk, an optical disk, or other storage medium, in a RAM or ROM or flash memory, processor, hard disk drive, optical disk drive, tape drive, etc. Likewise, the software or firmware may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware may include machine readable instructions that are capable of causing one or more processors to perform various acts such as acts described with reference to FIGS. 3 and 4.

Although the forgoing text sets forth a detailed description of several different embodiments, it should be understood that other embodiments are possible. For example, although a wireless communication system has been used as an example, the techniques for sub-carrier adaptation may also be utilized with wired multi-carrier communication systems.

It should therefore be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this disclosure, which would still fall within the scope of the claims.

What is claimed is:

1. A method, comprising:
 determining, at a communication device, an estimate of a communication channel;
 determining, at the communication device and using the estimate of the communication channel, a plurality of pairs of i) modulation schemes and ii) encoding schemes to be used with respective sets of adjacent orthogonal frequency division multiplexing (OFDM) subcarriers, including:
  determining, for data to be transmitted via a first set of adjacent OFDM, subcarriers, a first pair of a) a modulation scheme and b) an encoding scheme, and
  determining, for data to be transmitted via a second set of adjacent OFDM subcarriers, a second pair of a) a modulation scheme and b) an encoding scheme, wherein the second pair is different than the first pair;
 generating, at the communication device, a packet for transmission via the communication channel, wherein i) all data modulated on the first set of adjacent OFDM subcarriers is modulated and encoded using the first pair of a) the modulation scheme and b) the encoding scheme, and ii) all data modulated on the second set of adjacent OFDM subcarriers is modulated and encoded using the second pair of a) the modulation scheme and b) the encoding scheme; and
 transmitting, by the communication device, the packet.

2. The method of claim 1, further comprising:
 determining, at the communication device, that no data is to be transmitted via a third set of adjacent OFDM subcarriers within the communication channel;
 wherein generating the packet includes generating the packet such that the packet includes no data modulated on the third set of adjacent OFDM subcarriers.

3. The method of claim 1, wherein:
 the first pair includes a first quadrature amplitude modulation (QAM) scheme having a first number of constellation points;
 the second pair includes a second QAM scheme having a second number of constellation points different than the first number of constellation points;
 all data modulated on the first set of adjacent OFDM subcarriers is modulated using the first QAM scheme; and
 all data modulated on the second set of adjacent OFDM subcarriers is modulated using the second QAM scheme.

4. The method of claim 1, further comprising:
 generating, at the communication device, a physical layer header of the packet to indicate:
  data modulated on the first set of adjacent OFDM subcarriers is modulated and encoded using the first pair of a) the modulation scheme and b) the encoding scheme, and
  data modulated on the second set of adjacent OFDM subcarriers is modulated and encoded using the second pair of a) the modulation scheme and b) the encoding scheme.

5. The method of claim 1, wherein:
 the packet is a first packet; and
 the method further comprises generating, at the communication device, a second packet that indicates:
  data modulated on the first set of adjacent OFDM subcarriers in the first packet is modulated and encoded using the first pair of a) the modulation scheme and b) the encoding scheme, and
  data modulated on the second set of adjacent OFDM subcarriers in the first packet is modulated and encoded using the second pair of a) the modulation scheme and b) the encoding scheme; and
 the method further comprises transmitting, by the communication device, the second packet prior to transmitting the first packet so that communication devices that receive the first packet can determine, prior to receiving the first packet, that:
  data modulated on the first set of adjacent OFDM subcarriers in the first packet is modulated and encoded using the first pair of a) the modulation scheme and b) the encoding scheme, and
  data modulated on the second set of adjacent OFDM subcarriers in the first packet is modulated and encoded using the second pair of a) the modulation scheme and b) the encoding scheme.

6. The method of claim 1, wherein:
 the packet is a first packet; and
 the method further comprises:
  receiving, at the communication device, a second packet; and
  determining, at the communication device, the estimate of the communication channel based on the reception of the second packet.

7. An apparatus comprising:
 a communication device implemented on one or more integrated circuits (ICs), the communication device including:
  a channel estimator implemented on the one or more ICs, the channel estimator configured to determine an estimate of a communication channel, a channel adaptation unit implemented on the one or more ICs, the channel adaptation unit configured to determine, using the estimate of the communication channel, a plurality of pairs of i) modulation schemes and ii) encoding schemes to be used with respective sets of adjacent orthogonal frequency division multiplexing (OFDM) subcarriers, including:
  determining, for data to be transmitted via a first set of adjacent OFDM, subcarriers, a first pair of a) a modulation scheme and b) an encoding scheme, and
  determining, for data to be transmitted via a second set of adjacent OFDM subcarriers, a second pair of a) a modulation scheme and b) an encoding scheme, wherein the second pair is different than the first pair;
wherein the communication device further includes a transmitter unit implemented on the one or more ICs, the transmitter unit configured to generate the packet for transmission, wherein:
  i) all data modulated on the first set of adjacent OFDM subcarriers is modulated and encoded using the first pair of a) the modulation scheme and b) the encoding scheme, and
  ii) all data modulated on the second set of adjacent OFDM subcarriers is modulated and encoded using the second pair of a) the modulation scheme and b) the encoding scheme;
wherein the transmitter unit is further configured to transmit the packet.

8. The apparatus of claim 7, wherein the transmitter unit is configured to:
  determine that no data is to be transmitted via a third set of adjacent OFDM subcarriers within the communication channel; and
  generate the packet such that the packet includes no data modulated on the third set of adjacent OFDM subcarriers.

9. The apparatus of claim 7, wherein:
  the first pair includes a first quadrature amplitude modulation (QAM) scheme having a first number of constellation points;
  the second pair includes a second QAM scheme having a second number of constellation points different than the first number of constellation points;
  all data modulated on the first set of adjacent OFDM subcarriers is modulated using the first QAM scheme; and
  all data modulated on the second set of adjacent OFDM subcarriers is modulated using the second QAM scheme.

10. The apparatus of claim 7, wherein the transmitter unit is configured to:
  generate a physical layer header of the packet to indicate:
    data modulated on the first set of adjacent OFDM subcarriers is modulated and encoded using the first set of a) the modulation scheme and b) the encoding scheme, and
    data modulated on the second set of adjacent OFDM subcarriers is modulated and encoded using the second set of a) the modulation scheme and b) the encoding scheme.

11. The apparatus of claim 7, wherein:
the packet is a first packet; and
the transmitter unit is configured to generate a second packet to indicate:
  data modulated on the first set of adjacent OFDM subcarriers in the first packet is modulated and encoded using the first set of a) the modulation scheme and b) the encoding scheme, and
  data modulated on the second set of adjacent OFDM subcarriers in the first packet is modulated and encoded using the second set of a) the modulation scheme and b) the encoding scheme; and
the transmitter unit is configured to transmit the second packet prior to transmitting the first packet so that communication devices that receive the first packet can determine, prior to receiving the first packet, that:
  data modulated on the first set of adjacent OFDM subcarriers in the first packet is modulated and encoded using the first set of a) the modulation scheme and b) the encoding scheme, and
  data modulated on the second set of adjacent OFDM subcarriers in the first packet is modulated and encoded using the second set of a) the modulation scheme and b) the encoding scheme.

12. The apparatus of claim 7, wherein:
the packet is a first packet;
the communication device further includes a receiver unit implemented on the one or more ICs;
the receiver unit is configured to receive a second packet; and
the channel estimator is configured to:
  determine the estimate of the communication channel based on the reception of the second packet.

13. The apparatus of claim 7, wherein the transmitter unit comprises:
  an encoder implemented on the one or more ICs, wherein the encoder is configured to:
    for all data to be modulated on the first set of adjacent OFDM subcarriers, encode using the encoding scheme in the first pair, and
    for all data to be modulated on the second set of adjacent OFDM subcarriers, encode using the encoding scheme in the second pair.

14. The apparatus of claim 13, wherein the transmitter unit comprises:
  a modulator implemented on the one or more ICs, wherein the modulator is coupled to the encoder, and wherein the modulator is configured to:
    for all data to be modulated on the first set of adjacent OFDM subcarriers, modulate using the modulation scheme in the first pair, and
    for all data to be modulated on the second set of adjacent OFDM subcarriers, modulate using the modulation scheme in the second pair.

15. The apparatus of claim 7, wherein the communication device further comprises:
  a plurality of antennas coupled to the transmitter unit.

* * * * *